(12) United States Patent
Long et al.

(10) Patent No.: US 6,232,820 B1
(45) Date of Patent: May 15, 2001

(54) METHOD AND APPARATUS FOR DYNAMIC CLOCK GATING

(75) Inventors: Kevin J. Long, Sacramento; Prasanna C. Shah, Folsom, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/332,764

(22) Filed: Jun. 14, 1999

(51) Int. Cl.$^7$ .................................................. H03K 17/04
(52) U.S. Cl. .............................................. 327/374; 327/544
(58) Field of Search .................................. 327/298, 299, 327/374, 544

(56) References Cited

U.S. PATENT DOCUMENTS 5,603,037 * 2/1997 Aybay ................................. 395/750
5,661,673 * 8/1997 Davis ................................... 708/628
5,661,751 * 8/1997 Johnson ............................... 375/219

\* cited by examiner

*Primary Examiner*—Toan Tran
*Assistant Examiner*—Cassandra Cox
(74) *Attorney, Agent, or Firm*—Blakely, Sokoloff, Taylor & Zafman LLP

(57) ABSTRACT

According to one embodiment, an integrated circuit is disclosed that includes a plurality of functional unit blocks (FUBs), wherein each of the plurality of FUBs further includes a clock gated circuit and a clock gating circuit. The clock gating circuit immediately ungates clock signals to be received at the clock gated circuit whenever the clock gated circuit is to transition from an idle state to a non-idle state. According to a further embodiment, the clock gating circuit also immediately gates the clock signals whenever the clock gated circuit is to transition from a non-idle state to the idle state.

22 Claims, 7 Drawing Sheets

METHOD AND APPARATUS FOR DYNAMIC CLOCK GATING

FIELD OF THE INVENTION

The present invention relates to power management in a computer system; more particularly, the present invention relates to clock gating circuits.

BACKGROUND

Clock gating is a power management technique used to reduce the power consumption associated with a clock in an integrated circuit. In addition to reducing power consumption, a clock gating system should provide consistent system performance. The clock gating process is implemented by placing various logic components within the integrated circuit in an idle state whenever they are not conducting data transactions. This is accomplished by preventing a particular logic component from receiving system clock pulses (i.e., gating the system clock). Further, while in the idle state, the logic component must be accorded access to the system clock (i.e., ungating the system clock (or waking up the logic component)) whenever it is ready to receive data.

FIG. 1 is a block diagram of an exemplary clock gating circuit coupled to a logic circuit. The clock gating circuit includes a d-latch and an and-gate. The logic circuit continuously transmits a status signal to the data input of the d-latch. Whenever the logic circuit is receiving data, the status signal is transmitted to the d-latch as a logical zero. Accordingly, the and-gate is activated and a logic clock pulse (LOGIC CLK) is transmitted from the clock gating circuit to the logic circuit. LOGIC CLK, in turn, drives the data transactions conducted at the logic circuit.

Whenever the logic circuit is not receiving data that is to be acted upon by the logic circuit, the logic circuit enters a sleep state and a logic 1 is transmitted to the input of the d-latch. In this case, the and-gate, is deactivated and LOGIC CLK is gated. The logic circuit remains in the sleep state as long as the status signal remains a logical one (i.e., the logic circuit is not receiving data). However, once the logic circuit is ready to wake up, a logic 0 is transmitted to the clock gating circuit. As a result, LOGIC CLK is ungated.

The problem with typical clock gating circuits is that there is usually a one or two clock delay from the time the logic circuit enters the idle state until LOGIC CLK is actually gated. Similarly, there is a one or two clock delay from the time the logic circuit is ready to wake up before LOGIC CLK is ungated. Thus, the use of typical clock gating circuits result in inefficient clock performance since one or more clock cycles are wasted before gating and ungating the clock. Therefore, an efficient method of gating and ungating logic circuits within an integrated circuit is desired.

SUMMARY OF THE INVENTION

According to one embodiment, an integrated circuit is disclosed that includes a clock gated circuit and a clock gating circuit. The clock gating circuit immediately ungates clock signals to be received at the clock gated circuit whenever the clock gated circuit is to transition from an idle state to a non-idle state.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for dynamic clock gating is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid the present invention.

Figure 1:
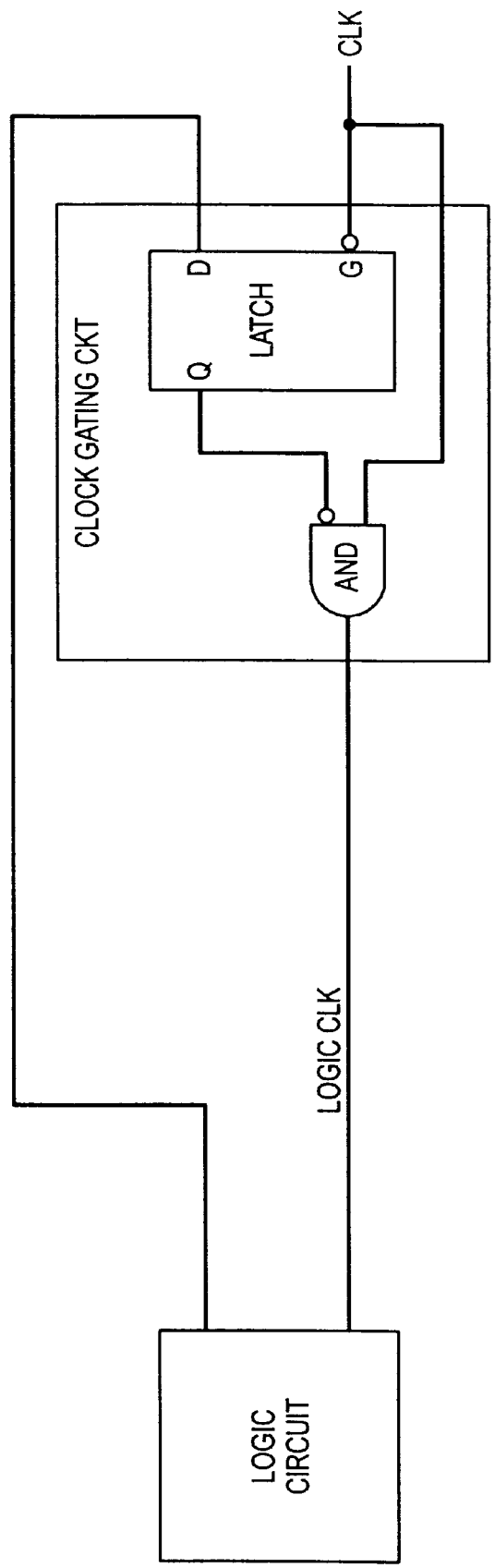
FIG. 1 is a block diagram of an exemplary clock gating circuit.
Figure 2:
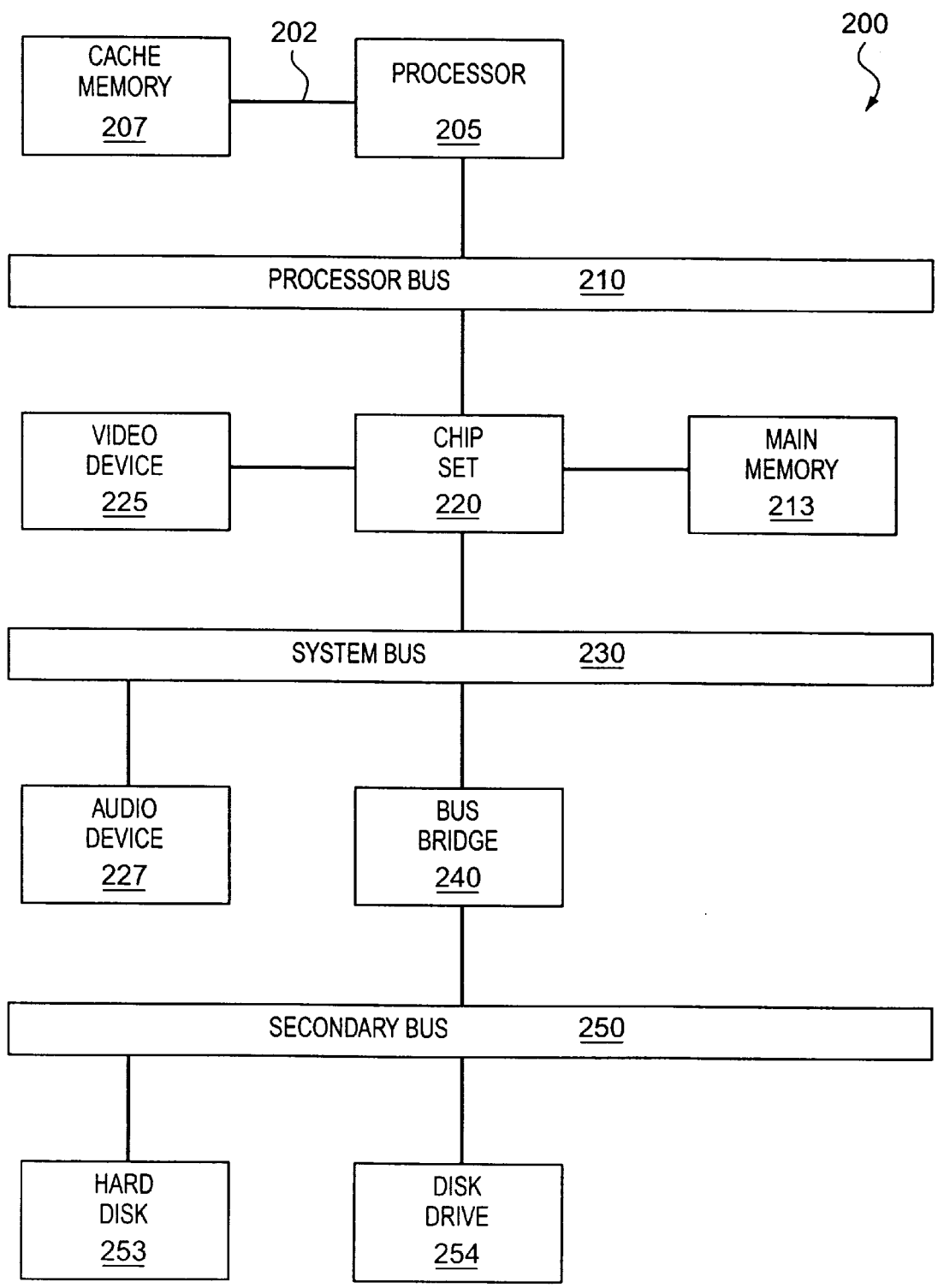
FIG. 2 is a block diagram of one embodiment of a computer system.

FIG. 2 is a block diagram of one embodiment of a computer system 200. Computer system 200 includes a central processing unit (processor) 205 coupled to processor bus 210. In one embodiment, processor 205 is a processor in the Pentium® family of processors including the Pentium® II processor family and mobile Pentium® and Pentium® II processors available from Intel Corporation of Santa Clara, Calif. Alternatively, other processors may be used. Processor 205 may include a first level (L1) cache memory (not shown in FIG. 2).

In one embodiment, processor 205 is also coupled to cache memory 207, which is a second level (L2) cache memory, via dedicated cache bus 202. The L1 and L2 cache memories can also be integrated into a single device. Alternatively, cache memory 207 may be coupled to processor 205 by a shared bus.

Chip set 220 is also coupled to processor bus 210. In one embodiment, chip set 220 is the 440BX chip set available from Intel Corporation; however, other chip sets can also be used. Main memory 213 is coupled to processor bus 210 through chip set 220. Main memory 213 and cache memory 207 store sequences of instructions that are executed by processor 205. In one embodiment, main memory 213 includes dynamic random access memory (DRAM); however, main memory 213 may be implemented using other memory types. The sequences of instructions executed by processor 205 may be retrieved from main memory 213, cache memory 207, or any other storage device. Additional devices may also be coupled to processor bus 210, such as multiple processors and/or multiple main memory devices. Computer system 200 is described in terms of a single processor; however, multiple processors can be coupled to processor bus 210.

Video device 225 is also coupled to chip set 220. In one embodiment, video device includes a video monitor such as a cathode ray tube (CRT) or liquid crystal display (LCD) and necessary support circuitry.

Processor bus 210 is coupled to system bus 230 by chip set 220. In one embodiment, system bus 230 is a Peripheral Component Interconnect (PCI) Specification Revision 2.1 standard bus developed by Intel Corporation of Santa Clara, Calif.; however, other bus standards may also be used. Multiple devices, such as audio device 227, may be coupled to system bus 230.

Bus bridge 240 couples system bus 230 to secondary bus 250. In one embodiment, secondary bus 250 is an Industry Standard Architecture (ISA) Specification Revision 1.0a bus developed by International Business Machines of Armonk, N.Y. However, other bus standards may also be used, for example the Extended Industry Standard Architecture (EISA) Specification Revision 3.12 developed by Compaq Computer, et al. Multiple devices, such as hard disk 253 and disk drive 254 may be coupled to secondary bus 250. Other devices, such as cursor control devices (not shown in FIG. 2), may be coupled to secondary bus 250.

Figure 3:
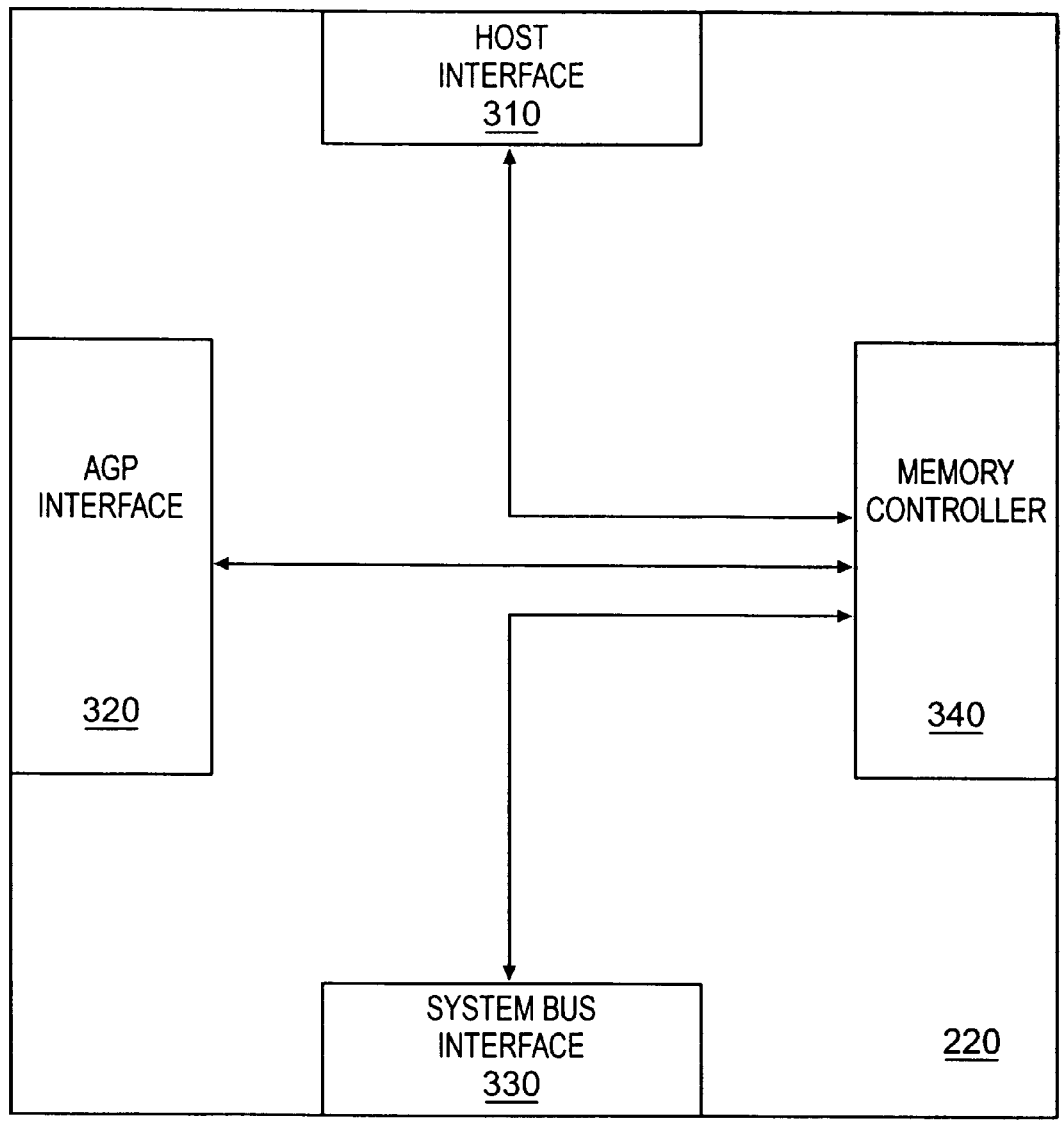
FIG. 3 is a block diagram of one embodiment of a chipset.

FIG. 3 is a block diagram of one embodiment of chipset 220. Chipset 220 includes a host interface 310 for coupling to processor bus 210. Host interface 310 receives requests from processor 205 to access main memory 213. Chipset 220 also includes an Accelerated Graphics Port (AGP) Specification Revision 2.0 interface 320 developed by Intel Corporation of Santa Clara, Calif. AGP interface 320 handles video data requests to access main memory 213. In addition, chipset 220 includes a system bus interface 330 for coupling to system bus 230. System bus interface 330 receives requests from input/output (I/O) devices located on system bus 230 (e.g., audio device 227) to access main memory 213.

Further, chipset 220 includes a memory controller 340. Memory controller 340 is coupled to AGP interface 320, and system bus interface 330. Memory controller 340 accesses main memory 213 for memory transactions based upon commands received from processor 205 and one or more peripheral devices coupled to chip set 220, such as video device 225. Memory controller 340 may read data from, and write data to, main memory 213.

According to one embodiment, each of the components within chipset 220 enters an idle state whenever a particular component is not receiving data that requires it to take action and whenever the particular component is not transmitting data. For example, if system bus interface 330 is not accessing main memory 213 it goes into an idle state. Alternatively, each component may go into the idle state only if chipset 220 is not conducting data transactions.

Figure 4:
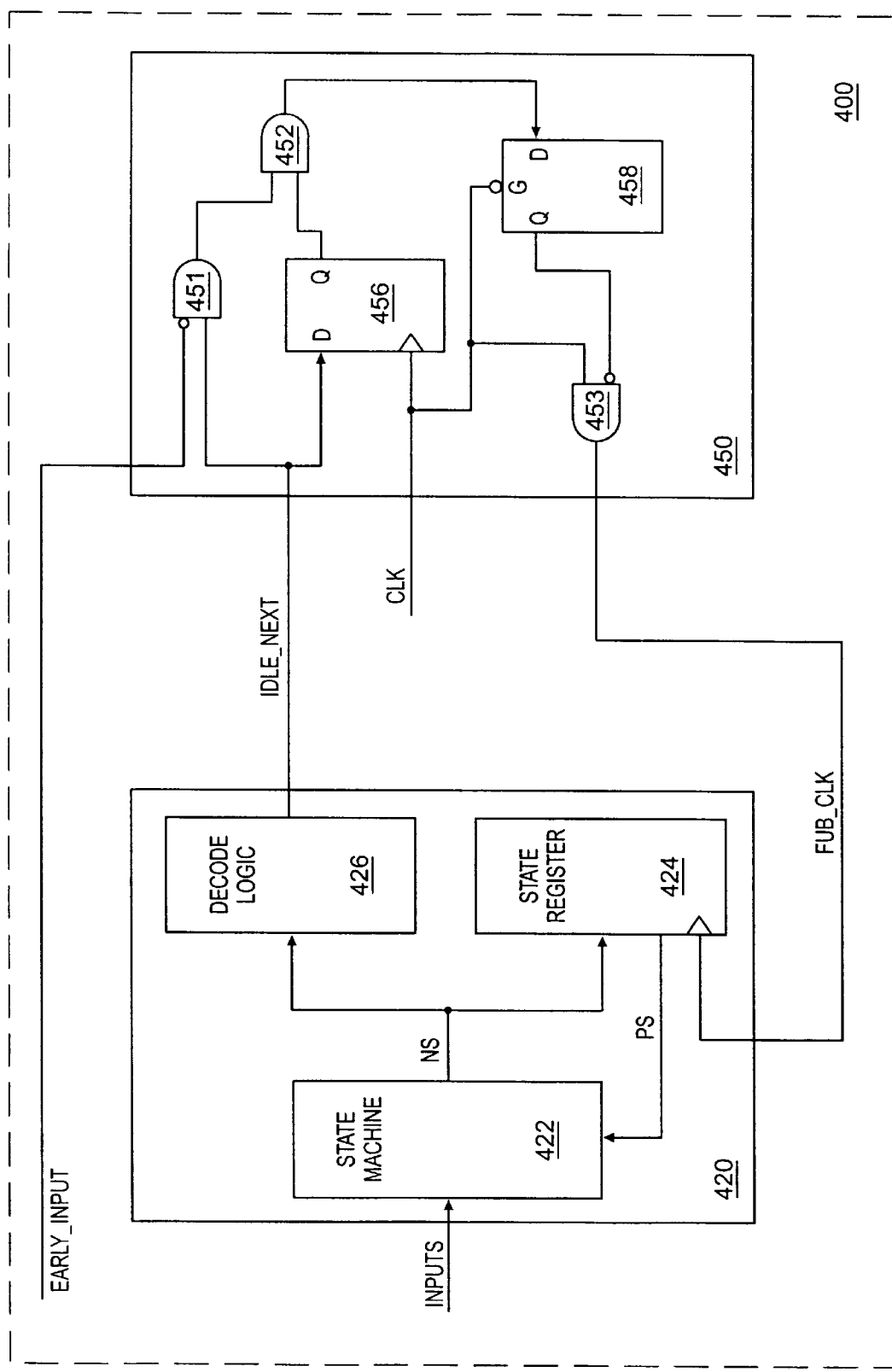
FIG. 4 is a block diagram of one embodiment of a functional unit block.

FIG. 4 is a block diagram of one embodiment of a functional unit block (FUB) 400. FUB 400 is logic circuitry that may encompass any of the components within chipset 220 (e.g., host interface 310, AGP interface 320, etc.). Also, FUB 400 could be incorporated in any other logic circuitry within computer system 200. Further, FUB 400 could be used in integrated circuit applications apart from computer system 200.

FUB 400 includes clock gated circuit 420 and clock gating circuit 450. In one embodiment, clock gated circuit 420 includes a state machine 422, state register 424 and decode logic 426. State machine 422 receives input data transmitted to FUB 400 and determines the next state in which FUB 400 is to operate. One state of operation of state machine 422 is an idle state. State machine 422 enters the idle state whenever no input data has been received or whenever data has been received but does not require state machine 422 to take action. Subsequent to determining the next state, state machine 422 transmits a next state signal (NS). According to one embodiment, NS may be a 3-bit state vector. However, it will be appreciated that NS may be implemented using other values.

State register 424 includes multiple registers corresponding to the number of states in state machine 422. According to one embodiment, state machine 422 includes 8 state registers. However, state register 424 may include as few as one or as many as one thousand registers. State register 424 receives the NS signal and transitions from the current register to a register corresponding to the state indicated by the NS signal. According to one embodiment, the NS signal is an encoded signal that represents the address of the register in which to transition to.

One of the registers included within state register 424 corresponds to the idle state within state machine 422. As mentioned above, FUB 400 is idle whenever state machine 422 is in the idle state. State register 424 also receives FUB clock pulses (FUB_CLK) from clock gating circuit 450 that drives clock gated circuit 420. Further, state register 424 transmits a present state signal (PS) to state machine 422 which indicates that state register 424 has made the transition to the state indicated by the NS signal. Upon receiving the PS signal, state machine 422 transitions to the new state.

Decode logic 426 receives the NS signal and transmits an indication signal (IDLE_NEXT) to clock gating circuit 450. Whenever an NS signal is received that indicates that the next state is the idle state, decode logic 426 is activated and IDLE_NEXT is transmitted as a logical 1. However, if the NS signal does not indicate that the next state is the idle state, decode logic 426 is not activated and IDLE_NEXT is transmitted as a logical 0. Decode logic 426 may be an and-gate with a number of gates corresponding to the number of bits in the NS signal. Alternatively, decode logic 426 may be implemented using multiple and-gates. Further, the operation of decode logic 426 may be reversed such that a logical 0 is transmitted whenever decode logic 426 is activated and a logical zero is transmitted during deactivation.

Clock gating circuit 450 includes and-gates 451–453, register 456 and latch 458. Register 456 receives the IDLE_NEXT signal at its input, while the output is coupled to one input of and-gate 452. Further, register 456 receives clock pulses (CLK) from the system clock within computer system 200. The stored data contents of register 456 are transmitted to and-gate 452 on the rising edge of each CLK signal received. According to one embodiment, register 456 is a D flip-flop. However, other types of flip-flops, as well as other types of memory devices, may be used to implement register 456. According to another embodiment, clock gating circuit 450 may be included as a part of another FUB. Further, clock gating circuit 450 may be located on its own separate FUB.

The IDLE_NEXT signal is also received within clock gating circuit 450 at one input of and-gate 451. The other input of and-gate 451 is inverted and receives an indication signal (EARLY_INPUT), which will be explained in further detail below. As mentioned above, one input of and-gate 452 is coupled to register 456. In addition, and-gate 452 is coupled to and-gate 451. The input of latch 458 is coupled to and-gate 452 and its output is coupled to an inverted input of and-gate 453. Latch 458 also receives CLK signals. The stored data contents of latch 458 are transmitted to and-gate 453 on the low level of each CLK pulse received. And-gate 453 also receives CLK pulses.

If clock gated circuit 420 is in a non-idle state and the NS signal indicates that the next state will also be non-idle (i.e., IDLE_NEXT=0), register 456 and and-gate 452 receive the logical 0 value. As a result, and-gates 451 and 452 remain inactive and a logical 0 is transmitted from and-gate 452 to latch 458 on the next received CLK pulse. During the same clock pulse an FUB_CLK pulse is transmitted to state-register 424, causing clock gated circuit 420 to enter the next non-idle state.

If clock gated circuit 420 is in a non-idle state and the NS signal indicates that the next state will be the idle state (i.e., IDLE_NEXT=1), register 456 and and-gate 452 receive the logical 1 value. On the next received CLK pulse, register 456 activates and-gate 452 by transmitting a logical 1. Latch 458, in turn, receives a logical 1 value from and-gate 452. During the same clock pulse an FUB_CLK pulse is transmitted to state-register 424, causing register 424 to transition to the register associated with the idle state. Register 424 transmits the PS signal to state machine 422 and clock gated circuit 420 enters the idle state. Once the same CLK pulse goes to a low level, latch 458 transmits a logical one to and-gate 453. Consequently, and-gate 453 is de-activated and FUB_CLK is gated.

Figure 5:
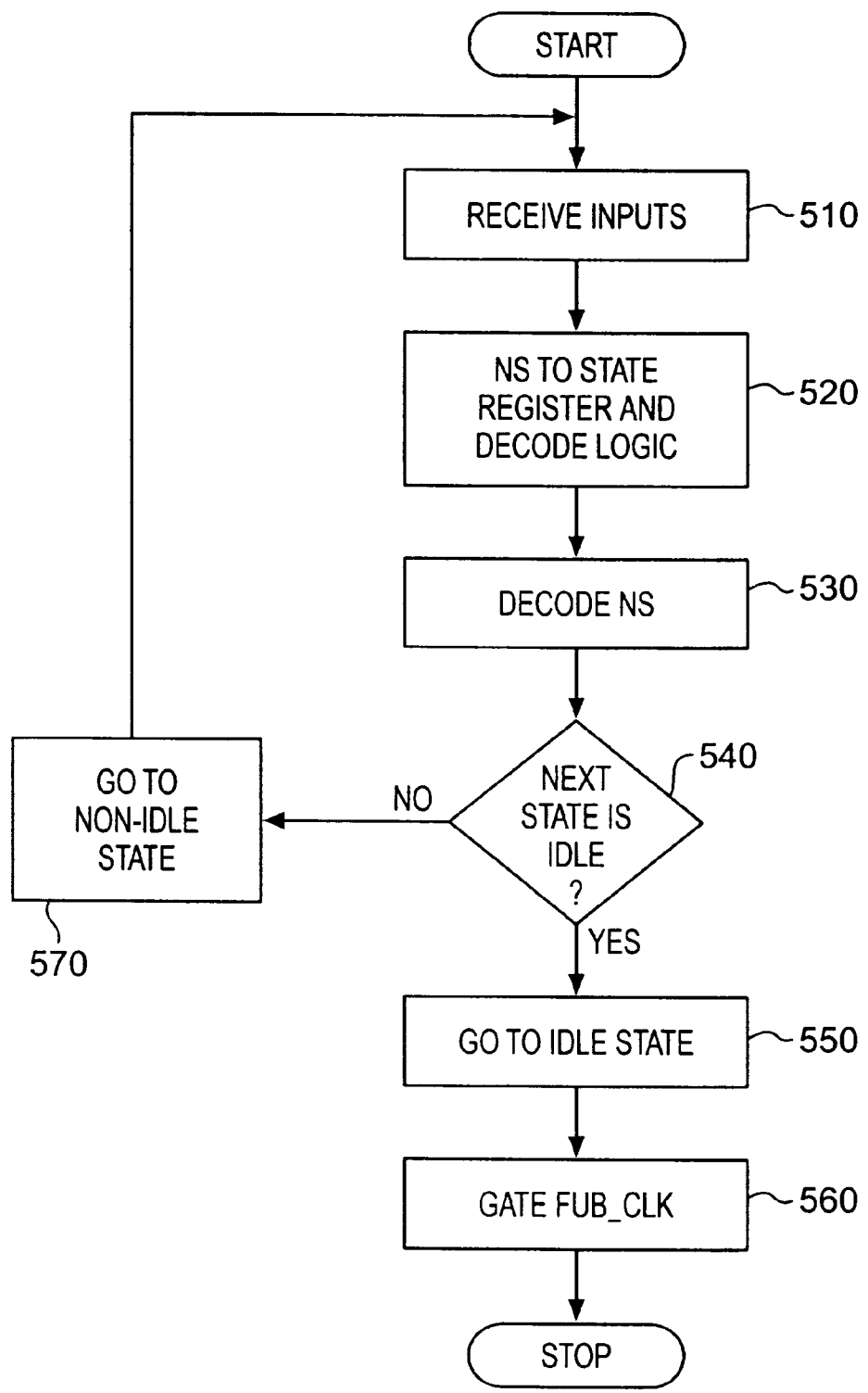
FIG. 5 is a flow diagram of one embodiment of the operation of a functional unit block.

FIG. 5 is a flow diagram of one embodiment of the operation of FUB 400 as it is operating in a non-idle state. At process block 510, input data is received at state machine 422. At process block 520, the NS signal is transmitted to state register 424 and decode logic 426. At process block 530, the NS signal is decoded at decode logic 426. At process block 540, it is determined whether the next state will be the idle state. If it is determined that the next state is a non-idle state, clock gated circuit 420 enters the next non-idle state, process block 570. Subsequently, control is returned to process block 510 wherein more input data is received at state machine 422. If it is determined that the next state is the idle state, clock gated circuit 420 enters the idle state on the ensuing CLK pulse, process block 550. At process block 560, clock gating circuit gates FUB_CLK.

Referring back to FIG. 4, if clock gated circuit 420 is in the idle state and the NS signal indicates that the next state will also be idle, register 456 and and-gate 452 continue to receive the logical 1 value. As a result, and-gates 451 and 452 remain active and a logical 1 is transmitted from and-gate 452 to latch 458 on the next received CLK pulse. On the low level of the same CLK pulse, latch 458 continues to transmit a logical 1 to and-gate 453. Accordingly, FUB_CLK remains gated and clock gated circuit 420 remains in the idle state.

If clock gated circuit 420 is in the idle state and the NS signal indicates that the next state will be a non-idle state, register 456 and and-gate 452 receive a logical 0 value. On the next received CLK pulse, and-gate 452 is deactivated by a logical 0 transmitted from register 456. Latch 458, receives a logical 0 value from and-gate 452. On the low level of the same CLK pulse, latch 458 transmits a logical 0 to and-gate 453. Consequently, and-gate 453 is activated and FUB_CLK is ungated. On the ensuing CLK pulse, FUB_CLK is transmitted to 424 and clock gated circuit 420 transitions to the non-idle state.

In some cases there is insufficient set-up margin due to excessive delays in decoding the NS signal. Thus, clock gating circuit 450 receives the EARLY_INPUT signal at the inverted input of and-gate 451. EARLY_INPUT may originate from another FUB, or a pin, on chip set 220. Whenever a logical 1 is received at the EARLY_INPUT gate of and-gate 451, and-gate 451 is de-activated although the received IDLE_NEXT signal may continue to be a logical 1. As a result, and-gate 451 de-activates and-gate 452 and a logical 0 is transmitted to latch 458. Latch 458 subsequently transmits a logical 0 to and-gate 453. Accordingly, and-gate 453 is activated and FUB_CLK is ungated. On the following CLK pulse, FUB_CLK is transmitted to 424 and clock gated circuit 420 transitions to the non-idle state.

Figure 6:
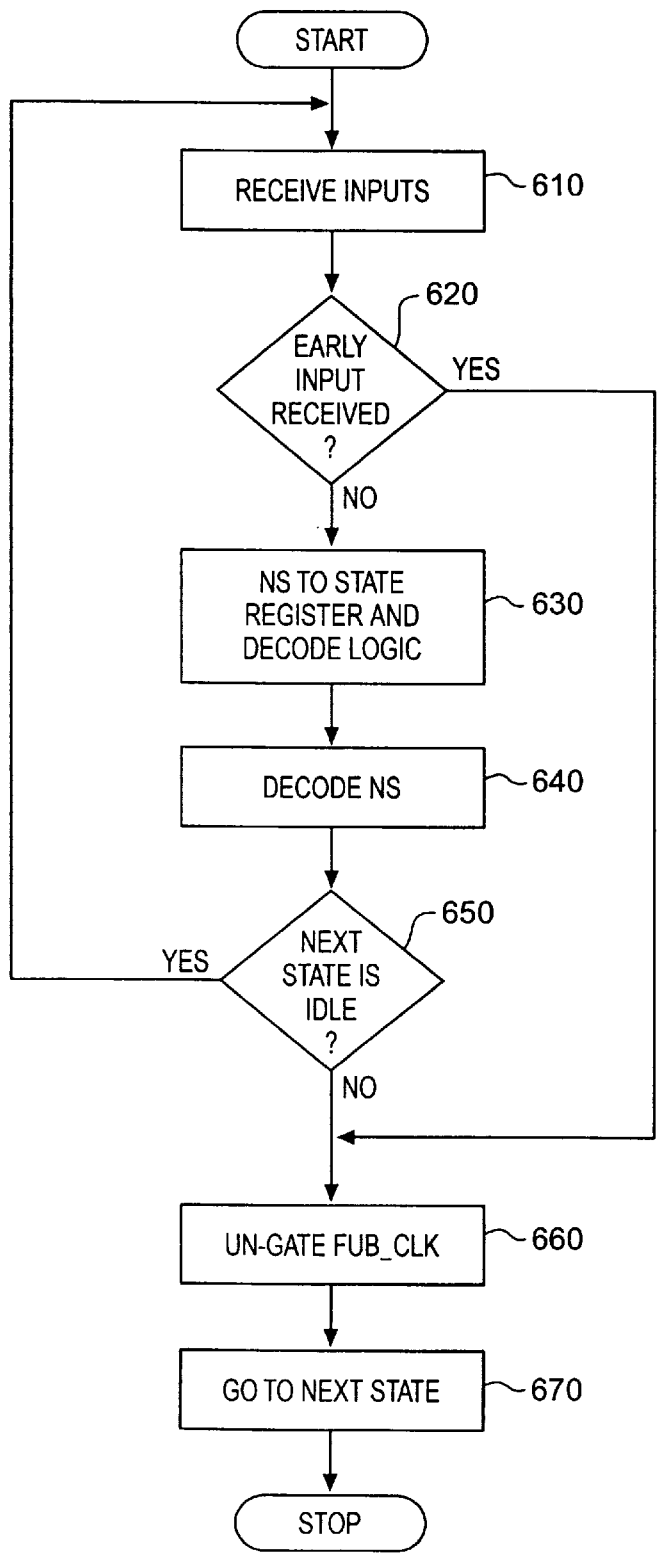
FIG. 6 is a flow diagram of one embodiment of the operation of a functional unit block.

FIG. 6 is a flow diagram of one embodiment of the operation of FUB 400 as it is operating in the idle state. At process block 610, input data is received at state machine 422. At process block 620, it is determined whether the EARLY_INPUT signal has been received at clock gating circuit 450. If it is determined that the EARLY_INPUT signal has not been received, the NS signal is transmitted to state register 424 and decode logic 426, process block 630. At process block 640, the NS signal is decoded at decode logic 426. At process block 650, it is determined whether the next state will be the idle state.

If it is determined that the next state is the idle state, clock gated circuit 420 remains in idle state and control is returned to process block 610 wherein more input data is received at state machine 422. If it is determined that the next state is a non-idle state, or that the EARLY_INPUT signal has been received, clock gating circuit 450 ungates FUB_CLK, process block 660. At process block 670, clock gated circuit 420 enters a non-idle state on the ensuing CLK pulse.

Figure 7A:
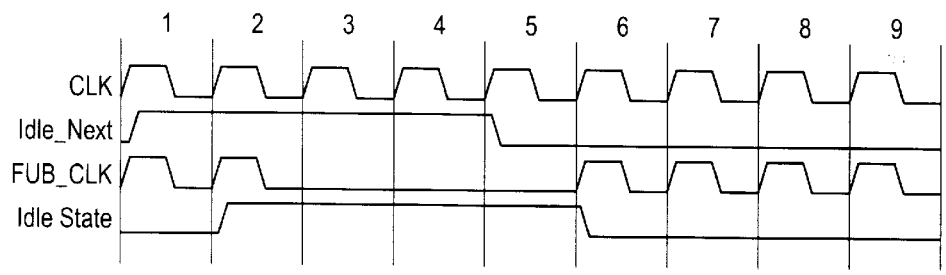
FIG. 7a is a clock diagram for one embodiment of the operation of a functional unit block.

Although FUB 400 has been described with respect to a particular circuit design, one of ordinary skill in the art will appreciate that FUB 400 may be modified to achieve the same or similar results. For example, and-gates 451 and 453, and latch 458 may be implemented without the use of inverted gates. FIGS. 7a–7d are clock diagrams for the operation of FUB 400. FIG. 7a illustrates a standard power down and wake up scenario. In such a scenario the NS signal 420 is decoded as idle (i.e., IDLE_NEXT is high) in clock 1. In clock 2, clock gated circuit 420 enters the idle state, while the FUB_CLK is gated by clock 3. In clock 5, the NS signal is decoded as something other than idle. On the low portion of clock 5 FUB_CLK is ungated. At clock 6, FUB_CLK is started and clock gated circuit 420 exits the idle state.

Figure 7B:
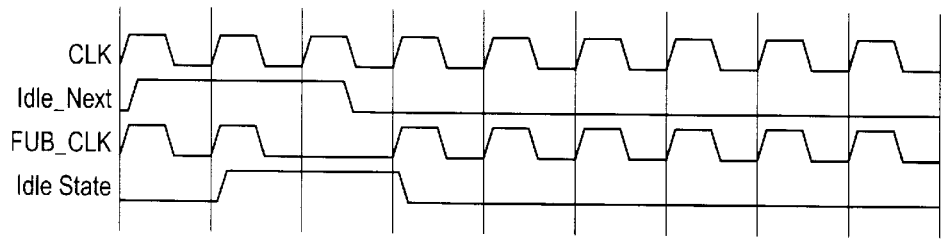
FIG. 7b is a clock diagram for one embodiment of the operation of a functional unit block.

FIG. 7b illustrates the standard power down scenario with wake up occurring one clock pulse after power down. The power down sequence in this scenario is the same as described above (i.e., FUB_CLK is gated before clock 3). However, the NS signal is decoded as something other than idle in clock 3. On the low portion of clock 3 FUB_CLK is ungated. At clock 4, FUB_CLK is started and clock gated circuit 420 exits the idle state.

Figure 7C:
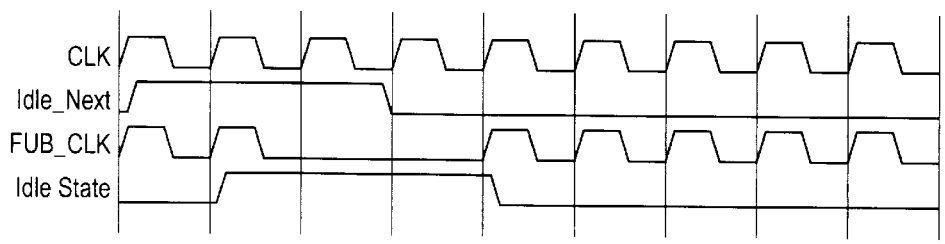
FIG. 7c is a clock diagram for one embodiment of the operation of a functional unit block.

FIG. 7c illustrates the standard power down scenario with a wake up triggered just before a clock edge. The power down sequence is the same as described above. However, the NS signal is decoded as something other than idle just before clock 4. On the low portion of clock 4 FUB_CLK is ungated. At clock 5, FUB_CLK is started and clock gated circuit 420 exits the idle state. In this scenario, the decoding of NS does not occur early enough to meet setup times. Therefore, there will be a one clock delay before ungating FUB_CLK.

Figure 7D:
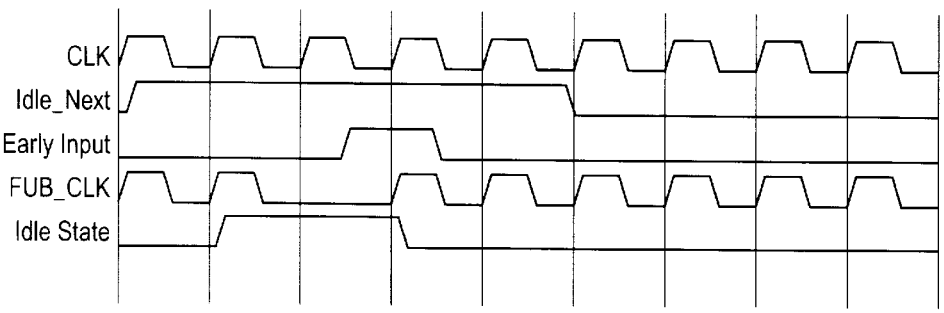
FIG. 7d is a clock diagram for one embodiment of the operation of a functional unit block.

FIG. 7d illustrates using the EARLY_INPUT signal for cases wherein the wake up occurs just before a clock edge. In this scenario, NS is decoded as something other than idle just before clock 6. However, the EARLY_INPUT signal is asserted at clock 3. On the low portion of clock 3, FUB_CLK is ungated. In clock 4, FUB_CLK is started and clock gated circuit 420 exits the idle state. As illustrated, there is zero clock delay before ungating FUB_CLK when early input is used, even if NS is not decoded early enough to meet setup times.

Thus, an efficient method and apparatus for gating circuits within an integrated circuit has been described.

What is claimed is:

1. An integrated circuit comprising a plurality of functional unit blocks (FUBs), wherein each of the plurality of FUBs comprises:

a clock gated circuit; and a clock gating circuit;

wherein the clock gating circuit ungates clock signals to be received at the clock gated circuit within one clock cycle whenever the clock gated circuit is to transition from an idle state to a non-idle state.

2. The integrated circuit of claim 1 wherein the clock gating circuit gates the clock signals within one clock cycle whenever the clock gated circuit is to transition from a non-idle state to the idle state.

3. The integrated circuit of claim 2 wherein the clock gating circuit comprises:

a register coupled to the clock gated circuit; and a latch coupled to the register.

4. The integrated circuit of claim 2 wherein the clock gating circuit receives an indicator signal from the clock gated circuit indicating whether the next operating state of the clock gated circuit is an idle state or a non-idle state.

5. The integrated circuit of claim 4 wherein the clock gated circuit includes decode logic that generates the indicator signal.

6. The integrated circuit of claim 4 wherein the clock signals are ungated whenever the indicator signal indicates that the next operational state of the clock gated circuit is a non-idle state, and wherein the clock signals are gated whenever the indicator signal indicates that the next operational state of the clock gated circuit is the idle state.

7. The integrated circuit of claim 4 wherein the clock gating circuit receives an early indicator signal in cases wherein sufficient time is not available to transmit the indicator signal from the clock gated circuit, and wherein the early indicator signal indicates that the next operational state of the clock gated circuit is the idle state.

8. The integrated circuit of claim 1, wherein the clock gated circuit is located on a first functional unit block (FUB) and the clock gating circuit is located on a second FUB.

9. The integrated circuit of claim 1, wherein the clock gated circuit and the clock gating circuit are located on the first FUB.

10. A clock gating circuit comprising:

a register coupled to a logic circuit; and a latch coupled to the register wherein the clock gating circuit immediately ungates clock signals to be received at the logic circuit whenever the logic circuit is to transition from an idle state to a non-idle state.

11. The clock gating circuit of claim 10, wherein the clock gating circuit immediately gates the clock signals whenever the logic circuit is to transition from a non-idle state to the idle state.

12. The clock gating circuit of claim 11, wherein the clock gating circuit receives an indicator signal from the logic circuit indicating whether the next operating state of the logic circuit is an idle state or a non-idle state.

13. The clock gating circuit of claim 12, wherein the clock signals are ungated whenever the indicator signal indicates that the next operational state of the logic circuit is a non-idle state; and wherein the clock signals are gated whenever the indicator signal indicates that the next operational state of the logic circuit is the idle state.

14. The clock gating circuit of claim 13, wherein the clock gating circuit receives an early indicator signal in cases wherein sufficient time is not available to transmit the indicator signal from the logic circuit, wherein the early indicator signal indicates that the next operational state of the logic circuit is the idle state.

15. The clock gating circuit of claim 10, wherein the clock gating circuit further comprises:

a first and-gate coupled to the logic circuit;

a second and-gate coupled to the first and-gate, the register and the latch; and a third and-gate coupled to the register and the latch.

16. A method of gating clock signals received at a logic circuit, the method comprising:

receiving input data at the logic circuit;

determining whether the next operating state of the logic circuit is an idle state;

if so, entering the idle state; and gating the clock signals within one clock cycle of the logic circuit entering the idle state.

17. The method of claim 16, further comprising decoding a signal corresponding to the next operating state of the logic circuit prior to determining whether the next operating state of the logic circuit is an idle state.

18. The method of claim 16, further comprising the logic circuit entering the next non-idle state if it is determined that the next operating state of the logic circuit is not the idle state.

19. A method of ungating clock signals received at a logic circuit, the method comprising:

receiving input data at the logic circuit;

determining whether the next operating state of the logic circuit is a non-idle state;

if so, ungating the clock signals; and entering a non-idle state within one clock cycle of ungating the clock signals.

20. The method of claim 19, further comprising generating a signal corresponding to the next operating state of the logic circuit prior to determining whether the next operating state of the logic circuit is a non-idle state.

21. The method of claim 19, wherein the logic circuit remains in the idle state if it is determined that the next operating state of the logic circuit is the idle state.

22. The method of claim 19, further comprising:

determining whether an early input signal has been received at the logic circuit after receiving the input data;

if so, ungating the clock signals; and entering a non-idle state within one clock cycle of ungating the clock signals.

\* \* \* \* \*